United States Patent [19]
Fromm

[11] Patent Number: 5,541,680
[45] Date of Patent: Jul. 30, 1996

[54] SLIDE PROJECTOR ASSEMBLY

[76] Inventor: Wayne G. Fromm, 3500 Bathurst Street, Toronto, Ontario, Canada, M6A 2C6

[21] Appl. No.: 386,320

[22] Filed: Feb. 9, 1995

[51] Int. Cl.⁶ .................................................. G03B 29/00
[52] U.S. Cl. .................... 353/122; 434/314; 353/25; 353/15
[58] Field of Search .................... 353/15, 19, 122, 353/12 J, 25; 434/315, 314, 309, 85

[56] References Cited

U.S. PATENT DOCUMENTS

| | | |
|---|---|---|
| 2,427,612 | 9/1947 | Lobb . |
| 3,357,303 | 12/1967 | Staar ........................................ 353/15 |
| 3,389,636 | 6/1968 | Weitzmer et al. . |
| 3,484,160 | 12/1969 | Glass et al. . |
| 3,583,808 | 6/1971 | Glass ........................................ 353/15 |
| 3,599,549 | 8/1971 | Diuset ...................................... 353/19 |
| 3,685,892 | 8/1972 | Lewis ....................................... 353/19 |
| 3,691,312 | 9/1972 | Petersen ................................... 353/19 |
| 3,717,407 | 2/1973 | Dimitracopoulos .................... 353/120 |
| 3,829,207 | 8/1974 | Licitis ..................................... 353/120 |
| 3,871,757 | 3/1975 | Glass et al. .............................. 353/19 |
| 3,879,145 | 7/1975 | Schwartz ................................. 353/19 |
| 3,884,566 | 5/1975 | Staar ........................................ 353/19 |
| 4,014,604 | 3/1977 | Schwartz ................................. 353/120 |
| 4,043,651 | 8/1977 | Livingston ............................... 353/19 |
| 4,223,463 | 9/1980 | Good ....................................... 353/120 |
| 4,272,167 | 6/1981 | Kempster ................................. 353/120 |
| 4,470,675 | 9/1984 | DiGlaufilippo et al. .................. 353/15 |
| 4,473,280 | 9/1984 | Staar ........................................ 353/19 |
| 4,521,091 | 6/1985 | Theslof, Jr. ............................. 353/122 |
| 4,561,723 | 12/1985 | Hamano et al. . |
| 4,696,400 | 9/1987 | Warman ................................... 353/122 |
| 4,732,467 | 3/1988 | Sweeney .................................. 353/25 |
| 4,758,485 | 7/1988 | Drexler ................................... 353/120 |
| 4,765,734 | 8/1988 | Truc et al. .............................. 353/121 |
| 4,791,496 | 12/1988 | Kageyama et al. ..................... 353/19 |
| 4,982,278 | 1/1991 | Dahl et al. . |

*Primary Examiner*—William C. Dowling
*Attorney, Agent, or Firm*—John C. Thompson

[57] ABSTRACT

A slide projector assembly provided with novel slides which may be drawn upon and/or associated with a sound track specific to the slide being projected. The slides may be blank or have line drawings in which cases the slides may be drawn upon. In addition slides, either of the type set forth above, or of a more or less conventional photographic slide design, may be provided with unique machine readable slide identification means. A housing, which includes slide projection means, is also provided with slide identification reading means so that when a slide is placed in the slide receiving means of the slide projection means a recognition signal will be transmitted. This signal will be received by an audio recording and playback means which may initiate either the playing of a sound track or may set a flag at the beginning of a sound track which is to be recorded.

10 Claims, 3 Drawing Sheets

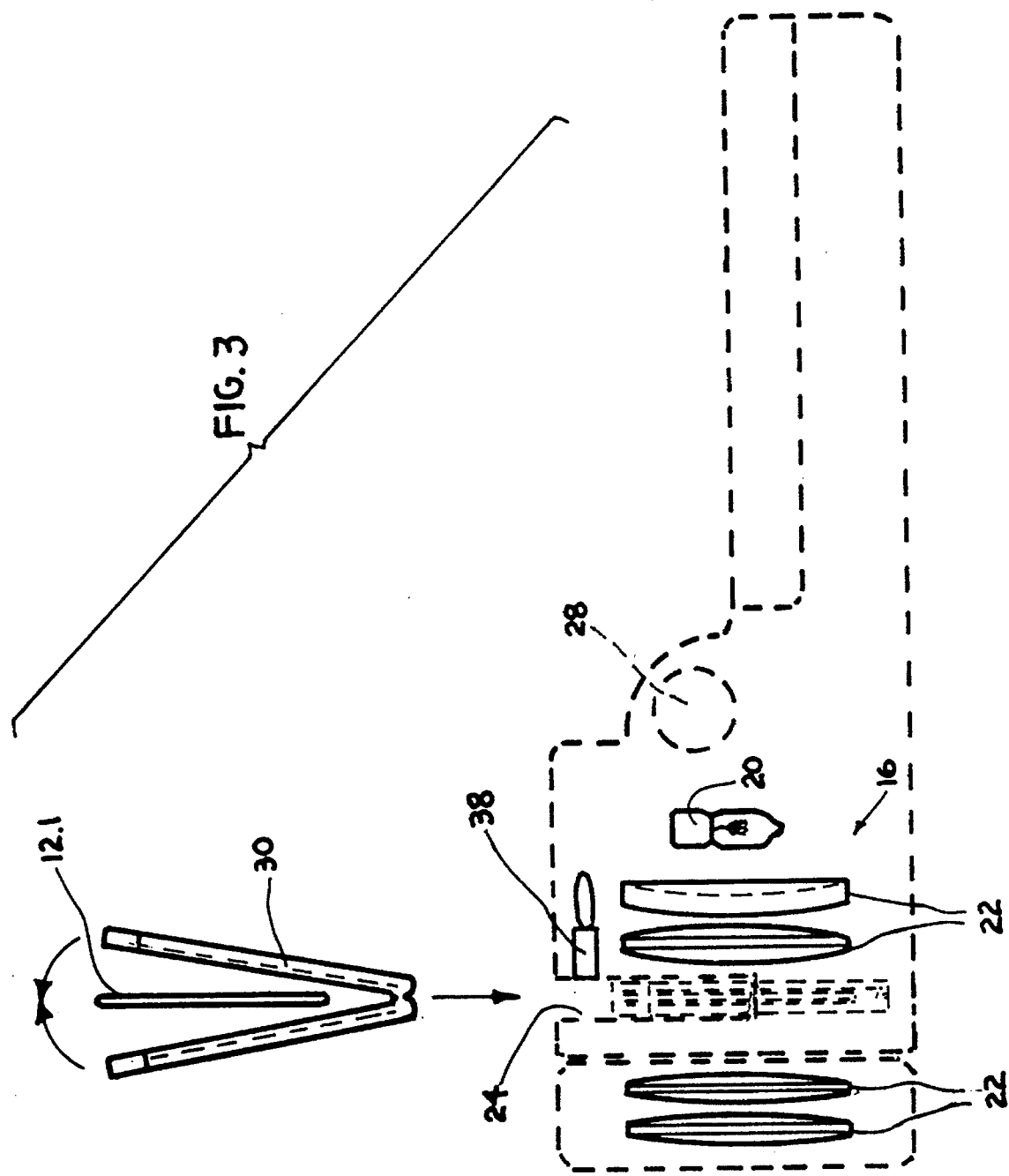

SLIDE PROJECTOR ASSEMBLY

TECHNICAL FIELD

The present invention relates generally to a novel slide projector assembly and also to novel slides which may be used with the slide projector assembly.

BACKGROUND OF THE INVENTION

According to one aspect of this invention a novel assembly has been developed for educational purposes and also for teaching a child fine motor skills. This educational and training assembly includes a housing having slide projection means and slides which are either blank or which merely have line drawings upon them. The child may color the slides for subsequent projection. Prior to the development of this invention, tracing and coloring devices were well known in the art. The most common example is the coloring book and box of crayons. Other devices have included tracing paper of various sorts which include an easel for supporting the tracing paper in a desired location as well as compartments for storing the marking devices. One such example is shown in U.S. Pat. No. 2,427,614. It is also well know in the art that a drawing may be made upon a sheet of plastic, such as Mylar, for projection via means of an overhead projector. However, applicant is not aware of any prior art where a child can be instructed to draw upon a blank slide, or a slide provided with line drawings, the slide subsequently being projected by a more or less conventional slide projector so that the child can clearly see his drawing in an enlarged scale.

According to another aspect of this invention slides may be provided having unique machine readable indicia. These slides may have photographic images thereon, they may have line drawings thereon which may be subsequently drawn upon, or they may be blank slides for subsequent drawing. A sound track media, associated with a novel slide projector housing, will permit the recording and/or playback of a story or message associated with each slide, there being means for identifying each slide, and audio recording and playback means for recording a message on the sound track media associated with each slide and/or playing back a message for each identified slide. In the prior art, U.S. Pat. No. 3,389,626 discloses a slide wherein sound track grooves are formed on the slide. U.S. Pat. No. 3,484,160 discloses a phonographic record associated with a plurality of slides mounted on a common frame. U.S. Pat. No. 4,758,485 also discloses slides wherein a strip of laser recording material is disposed on each slide, the laser recording material having prerecorded information concerning each particular slide. U.S. Pat. No. 4.014,604 and U.S. Pat. No. 4,765,734 each disclose a slide provided with a magnetic strip upon which a message or alpha-numeric information may be encoded. However, applicant is not aware of any prior art where slides may be randomly placed within a slide projector, the slides bearing machine readable indicia so that may be identified, and either a prerecorded sound track being played by the projector, or where a message or story about the identified slide may be recorded in a sound track media associated with the projector in such a manner that when the specific slide is again placed in the projector that message or story may be played back.

OBJECTS AND SUMMARY OF THE INVENTION

It is one object of the present invention to provide a slide projector assembly for facilitating the development of a child's fine motor skills. The slide projector assembly will include a plurality of slides which are to be colored or drawn upon, a plurality of marking devices for coloring or drawing upon the slides, and a housing having one or more compartments for receiving the plurality of slides and the plurality of marking devices. The housing further includes slide projection means for projecting an image on the slide when the slide is placed in the slide projection means.

It is another object of the present invention to provide an audio visual slide projector assembly which is capable of recording and/or playing back a sound track associated with each individual slide placed in this projector. To this end, each slide is provided with unique machine readable identifying means. In addition, a slide projection means is carried by a housing, the housing also having slide identification means for identifying each slide as it is placed in the slide projection means and for initiating a slide recognition signal. The slide projector assembly further includes an audio recording and playback mechanism either for recording a message for each slide in a sound track media, the message being associated with the unique identification means carried by the slide, or for playing back a previously recorded message for the slide identified by the slide identification means.

The foregoing objects as well as other objects and advantages of this invention will be more fully understood after a consideration of the follow detailed description taken in conjunction with accompanying drawings in which preferred forms of this invention are illustrated.

BRIEF DESCRIPTION OF THE DRAWINGS

FIG. 3 is a somewhat schematic side sectional view through the housing which carried the slide projection means.

DETAILED DESCRIPTION

IN GENERAL

Figure 1:
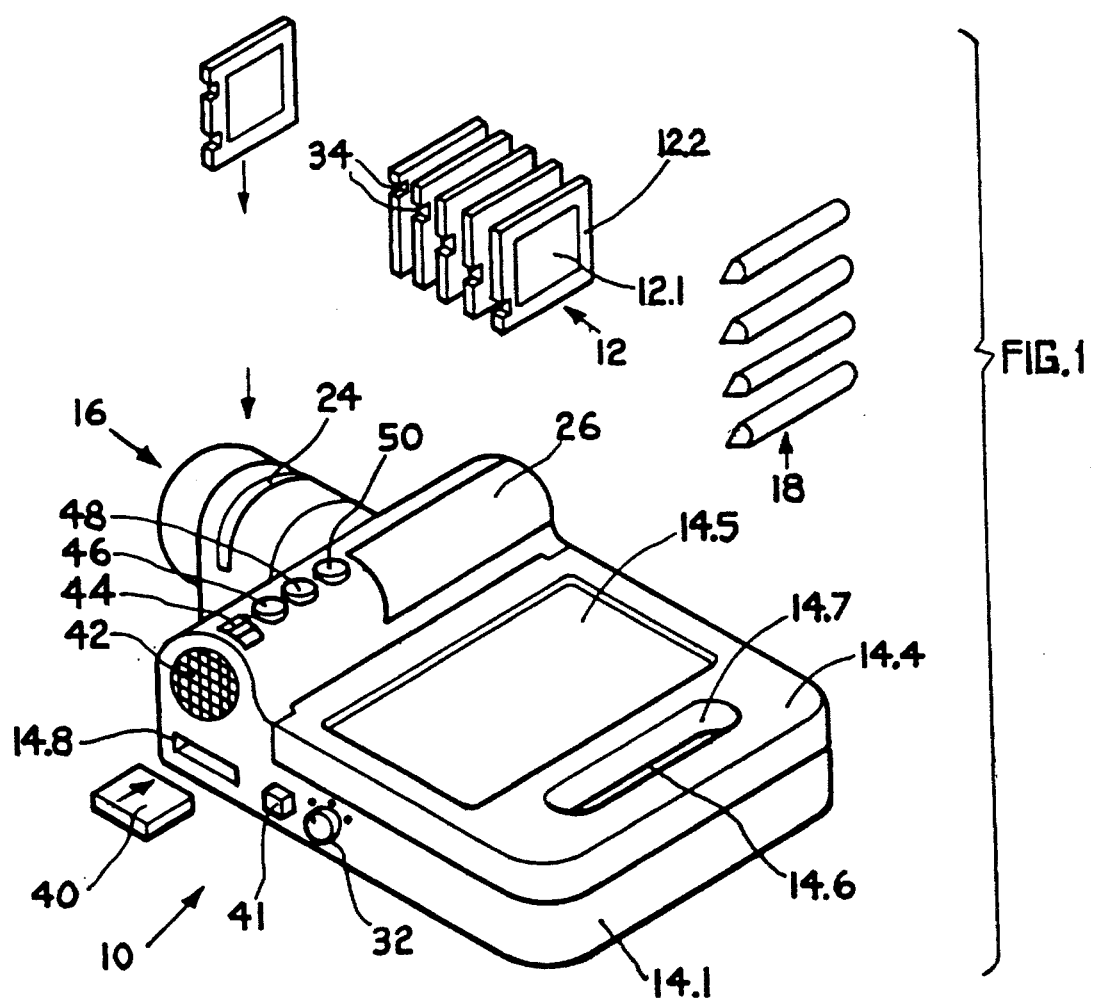
FIG. 1 is an exploded perspective view of a slide projector assembly of this invention showing, in addition to the housing which incorporates the slide projection means, a sound track media, a plurality of slides, and a plurality of marking devices.

With reference to FIG. 1, the slide projector assembly of this invention is indicated generally at 10. In each of the various embodiments of this invention, the slide projector assembly will include, at a minimum, a plurality of slides, which are indicated generally at 12, and a housing 14 which carries slide projection means 16 (best shown in FIG. 3). The slide projection means is capable of projecting an image on a slide 12 when the slide is placed in the projection means. In the various figures of this application, a combined slide projection assembly is illustrated which combines the novel features of this invention. Thus, FIG. 1 illustrates a slide projector assembly which is capable of teaching a child fine motor skills, the assembly including slides which may be drawn upon or colored, as well as a plurality of marking devices 18 for drawing upon or coloring the slides. This will permit a child to draw upon a slide or to color a slide and to then project the image created. This aspect of the invention can be considered as a slide projector assembly with drawing equipment. According to a second aspect of this invention, the slide projector assembly includes slides having unique machine readable identification means on each slide, a sound track media, audio recording and playback means either for recording a message for each slide in the sound track media or for playing back a message previously recorded for a uniquely identified slide, and control means. This aspect of this invention can be considered as a slide projector assembly with record and playback features. It should be apparent that these two features can be combined, as a combined slide projector assembly is shown in the various figures. However, for clarity of understanding each of these features will be initially explained separately.

SLIDE PROJECTOR ASSEMBLY WITH DRAWING EQUIPMENT

The slide projector assembly of this aspect of this invention includes a two part housing including a main housing portion 14.1, the main housing portion being provided with compartments 14.2 and 14.3. In addition, the housing also includes a lid 14.4 which is hinged to the main housing portion 14.1, the lid being provided with a drafting surface 14.5. Both the housing 14.1 and the lid 14.4 are provided with mating handle portions 14.6 and 14.7, respectively so that when the lid is closed the housing may be easily carried. Mounted within the housing is slide projection means 16 which includes a projection lamp 20, projection lens 22, and slide receiving means 24. The housing may further include a battery compartment, closed by battery compartment lid 26, which compartment may receive batteries 28 (FIG. 3). While batteries are shown for powering the projection lamp 20, it should be appreciated that the slide projection assembly of this invention may be powered by an external power source, such as house line current.

Figure 2:
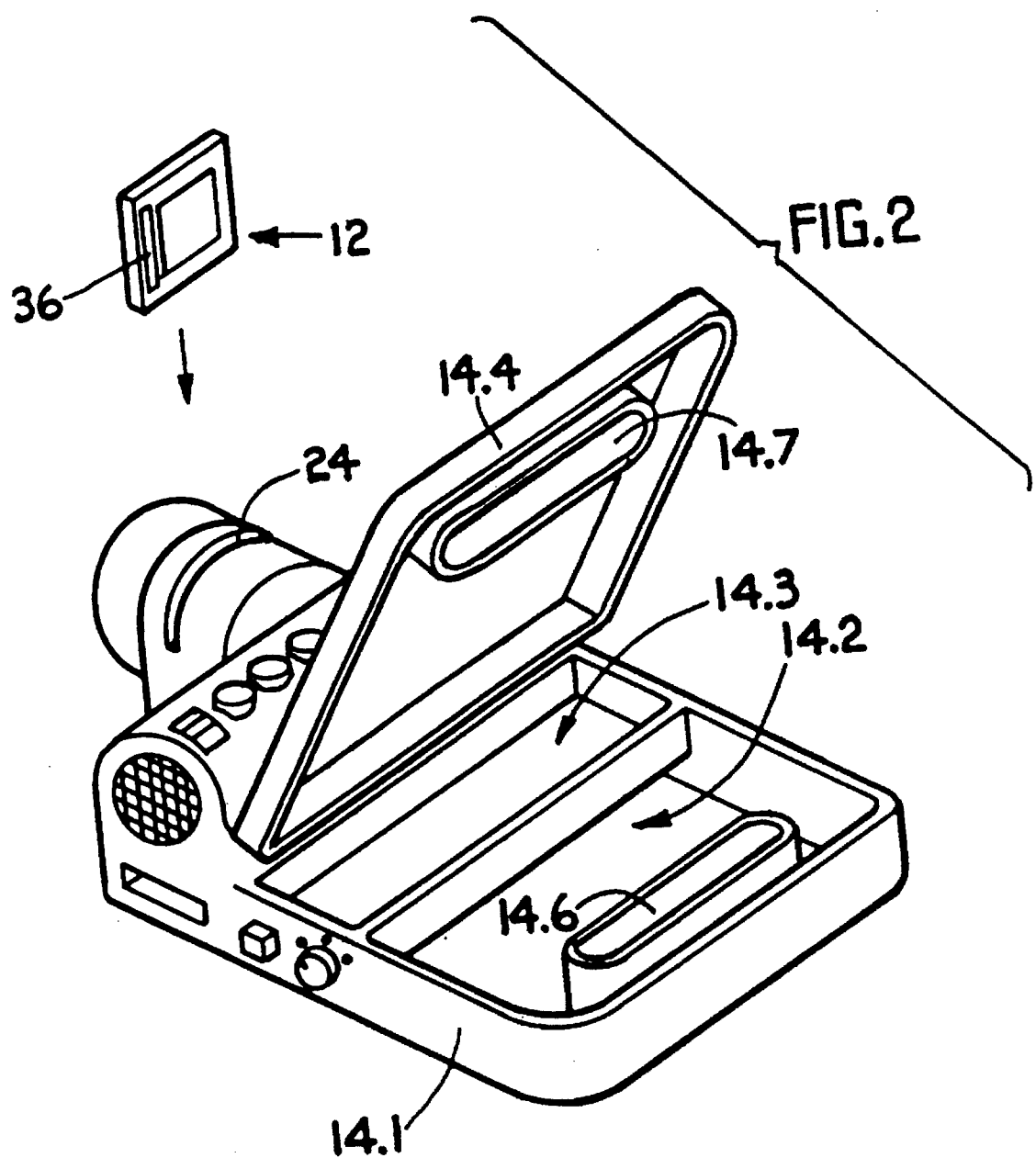
FIG. 2 is a view similar to FIG. 1, but showing the housing which carries the slide projection means in an open position.

The slides which are provided with the slide projector for teaching a child fine motor skills may be of differing types. As illustrated, the slides include a transparent media 12.1 surrounded by a frame 12.2. In the embodiment shown in FIG. 3 the slide consists entirely of the transparent media 12.1. As the slides are provided to assist a child developing fine motor skills, the 35 transparent media 12.1 is either blank or is provided with line drawings which the child may then fill in with suitable colors and/or shading. When this form of invention is used, the child will open the lid 14.4, remove the slide which he next desires to use, along with the marking devices 18, close the lid, place the slide upon the surface 14.5, and draw upon the slide. If the slide is a framed slide he will then place it directly into the projector in the manner indicated in FIG. 2. In the event it is an unframed slide, he will then place the slide in a slide carrier 30, which is then placed into the slide receiving means 24 in the manner indicated in FIG. 3. The slide projector is then turned on by means of the on/off control 32.

SLIDE PROJECTOR ASSEMBLY WITH RECORD AND PLAYBACK FEATURES

In a slide projector assembly with record and playback features each of the slides 12 is provided with a unique machine readable identification means. The unique identification means may be in the form of notches 34 along one edge of the slides. Alternatively it may be in the form of a magnetic strip 36. If a frame-less slide is provided, such as the type to be used in the FIG. 3 embodiment, the unique identification means may be bar coding printed along one edge of the slide, this feature not being illustrated. In addition, the housing is provided with slide identification reading means 38 for identifying each slide being inserted into the slide receiving means 24. The actual details of the slide identification reading means will be dependant upon the form of the identification means on the slide. However, it should be noted that as the slide is being inserted in the slide receiving means 24 that the slide identification reading means will read the slide and send out a suitable slide recognition signal to a processing unit (not shown) which identifies the particular slide being received, the processing unit being part of the audio recording and playback means.

The slide projector assembly is also provided with a sound track media as well as suitable audio playback means or playback and recording means. In the embodiment illustrated the sound track media 40 is removable and may be inserted into the projector housing 14 through a suitable slot 14.8. It may also be removed therefrom by pressing the ejector button 41. The sound media may be of differing types, the preferred type being a circuit board provided with suitable integrated circuit memory devices for storing either analog or digital memory. Other sound media which may be employed include CD-ROM disks upon which tracks can be imprinted and retrieved by a laser, or even floppy diskettes such as the 3½ inch diskettes used in PC computers. Alternative, the sound media may be standard tape cassettes (although this is not a preferred embodiment as the sound tracks cannot be randomly accessed). In addition, while it preferred to have the sound media removable, it may be contained within the housing. The advantage of having a removable sound media is that slides bearing photographic images may be provided with the slide projector assembly of this invention, the slides having unique machine readable slide identification means thereon, which unique identification means are matched with a prerecorded sound card 40 which may be inserted into the projector for playing back an audio version of a sound track which is associated with the particular slide being projected. This will permit a purchaser of this equipment to buy a package of slides having photographic images thereon, the package also having a sound card to be associated with the various slides. This will permit the purchaser to be able to play one, some, or all of the slides with the accompanying audio track on the sound card.

The actual details of the playback or playback and recording means will vary depending upon the particular sound media being employed. However, each audio record and playback means will include a microphone, a speaker, and controls for initiating recording, for stopping recording, and for erasing, as well as controls for placing the audio recording and playback means in either the play function or the record function. As shown in FIG. 1, the speaker may be mounted in the housing 14, in which case it will be placed behind the speaker grille 42. Alternatively, an electric connector may be provided for connecting an audio signal to an external speaker. Similarly, the microphone may be an condenser microphone 44 mounted within housing 14, or alternatively it may be a remote microphone connected to the apparatus by a suitable wire. The control means for controlling the recording and playback means will include the on/off control 32, which in the embodiment illustrated is a three position switch. It may be turned to an off position, to an on/play position, or to an on/record position. When it is in the on/record position, operation of the recording mechanism is further controlled by additional controls. In the embodiment illustrated, the additional controls are shown as a button 46 which is pressed to initiate the recording of a sound track on the sound track media 40, a button 48 which is pressed to stop the recording of a sound track, and a button 50 which is pressed to erase an identified sound track.

If slides having photographic images are provided with a sound track media, in operation each slide will be placed within the slide receiving means 24, the slide identification reading means 38 will read the unique slide identification and will transmit a slide recognition signal, which signal will be read by the audio recording and playback means to cause playing of the audio sound track associated with the specific slide being received by the slide projector assembly. When used in this manner, the sound recording media is prevented from recording, and thus can be considered to be in a "read-only" state.

COMBINED SLIDE PROJECTOR ASSEMBLY

In the event that the slides being used do not have a photographic image, but which are slides which have been drawn upon or colored by the user, a message can be recorded for each of these slides. Thus, the rotary switch 32 is moved to its on/record position, a slide 12 is inserted into the slide receiving means 24, and the slide identification reading means 38 initiates a slide recognition signal which is processed by the audio recording and playback means to set a slide specific flag in the recording media at the beginning of a track to be recorded. The operator then presses the start record button 46 and records a message into the microphone 44, which message is then placed on the flagged sound track of the recording media 40. At the completion of the message the operator will push the stop record button 48. The message can then be reviewed by removing the slide from the slide receiving means 24, putting the on/off control in the on/playback position, reinserting the slide into the slide receiving means 24, and then by listening to the recorded track. If the operator does not like the message which has been recorded he can simply erase it by pressing the erase button. He can now record a new message by simply turning the switch 32 to the on/record position, at which time the operator follows the sequence of steps outlined above.

Slides which have line drawings printed on them may be associate with a sound media which may tell a story about the line drawings. Thus, after a child has colored a slide with a line drawing, for example "Little Red Riding Hood", the child may place the slide in the slide receiving means and hear a sound track specific to the specific slide which the child has just colored.

Finally, if the operator has photographic slides with no unique machine readable slide identification means on them, such as slides which he has taken, he can place such identification means on the slides by purchasing suitable bar coded or magnetic strip information, and then adhesively securing them to the edge of the frame of a slide. Messages will then be recorded in the same manner as they are for slides which have been drawn upon.

While a preferred form of this invention has been described above and shown in the accompanying drawings, it should be understood that the applicant does not intend to be limited to the particular details described above and illustrated in the accompanying drawings, but intends to be limited only to the scope of the invention as defined by the following claims.

What is claimed is:

1. A slide projector assembly comprising the combination of:

a plurality of slides, each of the slides initially having no image so that prior to being inserted within the projector an image may be drawn upon each slide;

a plurality of marking devices for drawing upon the slides;

a housing having one or more compartments for receiving the plurality of slides and also for receiving the plurality of marking devices; and slide projection means carried by the housing for projecting an image carried by a slide when the slide is placed in the projection means.

2. An audio visual slide projector assembly comprising the combination of:

a plurality of slides, each slide having unique machine readable identifying means;

a housing;

slide projection means carried by the housing for projecting an image carried by a slide when the slide is placed in the projection means;

slide identification reading means carried by the housing for identifying each slide as it is placed in the projection means, and for initiating a slide recognition signal;

audio recording and playback means carried by the housing either for recording a message for each slide in a sound track media, the message being associated with the unique identifying means carried by the slide, or for playing back a message previously recorded for the slide identified by the slide identification reading means; and control means for controlling the operation of the audio visual projector in response to a slide recognition signal.

3. An audio visual slide projector assembly comprising the combination of:

a plurality of slides, each slide having unique machine readable identification means;

a plurality of marking devices for drawing upon the slides;

a housing having one or more compartments for receiving the plurality of slides and also for receiving the plurality of marking devices;

slide projection means carried by the housing for projecting an image carried by a slide when the slide is placed in the projection means;

slide identification reading means carried by the housing for identifying each slide as it is placed in the projection means, and for initiating a slide recognition signal;

audio recording and playback means carried by the housing either for recording a message for each slide in a sound track media, the message being associated with the unique identifying means carried by the slide, or for playing back a message previously recorded for the slide identified by the slide identification means; and control means for controlling the operation of the audio visual slide projector assembly in response to a slide recognition signal.

4. The slide projector assembly as set forth in either of claims 2 or 3 wherein each of the plurality of slides initially has no image so that prior to being inserted within the projector an image may be drawn upon the slide.

5. The slide projector assembly as set forth in either of claims 2 or 3 wherein at least one of the plurality of slides is provided with a line drawing which may be colored before projection.

6. The slide projector assembly as set forth in claim 2 wherein the slides have photographic images thereon and the sound track media is provided with a plurality of sound tracks, each of said sound tracks being associated with a specific photographic image in response to a slide recognition signal.

7. The slide projector assembly as set forth in either of claims 2 or 3 wherein the sound track media is removable.

8. The slide projector assembly as set forth in claim 6 wherein the sound track media is removable.

9. The slide projector as set forth in either claim 2 or claim 3 wherein the unique machine readable identifying means carried by each of the slides are notches carried by the sides of the slides.

10. The slide projector as set forth in either claim 2 or claim 3 wherein the unique machine readable identifying means is a magnetic strip extending along one side of the slides.

* * * * *